United States Patent

Hamilton et al.

[15] 3,693,083

[45] Sept. 19, 1972

[54] MANUAL DIGITAL SCALE

[72] Inventors: Martin W. Hamilton, Arlington Heights; William H. Jones, Villa Park, both of Ill.

[73] Assignee: Eaton Yale & Towne, Inc., Cleveland, Ohio

[22] Filed: Sept. 9, 1969

[21] Appl. No.: 856,436

[52] U.S. Cl. ................... 324/98, 177/48, 177/164, 177/210, 324/65 R
[51] Int. Cl. ................... G01r 17/02, G01r 27/02
[58] Field of Search ........... 324/98, 99, 99 D, 65 B; 177/48, 164, 210, 211

[56] References Cited

UNITED STATES PATENTS

| | | | |
|---|---|---|---|
| 2,920,316 | 1/1960 | Cohen | 324/99 X |
| 3,149,282 | 9/1964 | Wasserman | 324/99 |
| 3,317,833 | 5/1967 | Miller | 324/99 |
| 3,356,943 | 12/1967 | Wise | 324/98 |
| 3,430,141 | 2/1969 | Gilchrist | 324/98 X |
| 3,443,226 | 5/1969 | Knight | 324/98 X |
| 3,483,468 | 12/1969 | Gaynor | 324/99 |
| 3,030,569 | 4/1962 | Chilton | 177/211 X |
| 3,066,752 | 12/1962 | Spademan | 177/211 |
| 3,173,506 | 3/1965 | Clamp | 177/211 |
| 3,464,508 | 9/1969 | Engle et al. | 177/164 |

OTHER PUBLICATIONS

Scott, R.F.; Radio–Electronics; April 1956; pg. 44–47.

Primary Examiner—Rudolph V. Rolinec
Assistant Examiner—Ernest F. Karlsen
Attorney—Hill, Sherman, Meroni, Gross, & Simpson

[57] ABSTRACT

A manual digital scale system having a load cell for sensing the instantaneous mechanical load applied to a system and circuit means for coupling the load cell signal to a current summation point. A digital potentiometer arrangement is provided to produce current in digital steps, and means are provided to couple that current to the current summation point. An oscillator which may operate in the order of 2,500 Hz supplies power to the load cell at first and second phases. The output of the load cell is at a first phase, and the oscillator supplies power to the digital potentiometer at the second phase. The first and second phases are substantially 180° apart, and therefore current supplied by the digital potentiometer to the current summation point will subtract from current supplied thereto by the load cell. The output of the current summation point is coupled through an operational amplifier and a phase detector to a null indicator. Accordingly, the load being sustained by the load cell can be measured by gradually increasing the digital potentiometer setting until the current therefrom cancels the current output of the load cell. This condition is indicated by the null indicator. In the alternative, the output of the phase detector may be coupled to a differential amplifier and to a relay. By this latter arrangement, the value of the desired loading on the load cell can be preset into the digital potentiometer and loads such as grain or other similar goods can be gradually added to the load cell until the load is increased to the point where a null condition is obtained at the current summation point. When this occurs, the differential amplifier will reverse its position and operate the relay to trigger a signal indicating that the desired weight has been obtained. The digital potentiometer employed consists of a series of equal value resistors with a plurality of switch contacts being capable of connection to any one of the series connected resistors. Each one of the contacts has a scaling resistor connected in series therewith, and all of the contacts are connected in parallel to provide a common output. Each of the scaling resistors in sequence are one-tenth of the magnitude of the adjacent scaling resistor thereby providing an output which is digital in form.

5 Claims, 2 Drawing Figures

INVENTOR.
Martin W. Hamilton
William H. Jones

BY ATTORNEYS 3,693,083

MANUAL DIGITAL SCALE

BACKGROUND OF THE INVENTION

Field of the Invention

The field of art to which this invention pertains is load cell measuring circuits and in particular to circuits for generating a response when a given load is obtained on the load cell as well as to general readout circuits for load cells. The invention also pertains to digital potentiometer and to means for employing digital potentiometer to measure the load on a load cell.

SUMMARY OF THE INVENTION

It is an important feature of the present invention to provide an improved load cell measuring system.

It is also a feature of the present invention to provide a system for indicating the point at which a gradually increasing load on a load cell obtains a given desired weight.

It is an object of the present invention to provide a digital potentiometer arrangement for a load cell measuring circuit.

It is another object of the present invention to provide means for combining the output of a load cell with the output of a digital potentiometer and for triggering a response circuit to indicate when a null condition is obtained.

It is a further object of the present invention to provide a digital potentiometer for use at an opposite phase to the phase of operation of a load cell and to couple the output of the digital potentiometer to a current summation point which point also receives the output of the load cell.

It is another object of the present invention to provide a load cell measuring circuit which includes a phase detector and a differential amplifier, both of which are responsive to a combined signal from a digital potentiometer and from the load cell to produce a response signal when a given preset weight on the digital potentiometer is actually obtained on the load cell.

These and other objects, features and advantages of the invention will be readily apparent from the following description of a preferred embodiment thereof, taken in conjunction with the accompanying drawing, although variations and modifications may be effected without departing from the spirit and scope of the novel concepts of the disclosure.

DESCRIPTION OF THE PREFERRED EMBODIMENT

Figure 1:
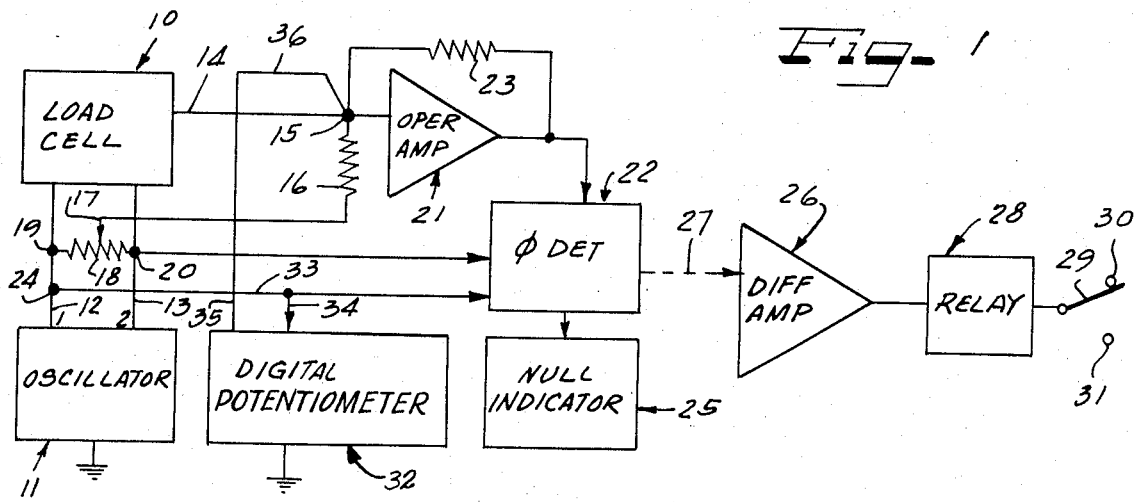
FIG. 1 is a block diagram showing some parts in schematic form and illustrating the combination of circuit elements and systems which are employed to produce the desirable results of the present invention.

The manual digital scale system of the present invention utilizes a conventional load cell which develops a signal of a first phase in response to input signals from an oscillator of the first and second phase wherein the first and second phases are substantially 180° apart.

A digital potentiometer is provided which consists of a number of series connected resistors having equal values. Each of the resistors has a contact point associated therewith and a plurality of movable contacts are selectably engageable with any one of the contact points associated with the series connected resistors. Each of the movable contacts has a scaling resistor connected in series therewith and each of the scaling resistors are connected in parallel at a common output terminal. In this way, the system provides digital-like outputs. For instance, one of the switches may provide a current signal which when equated to the load cell signal is indicative of readings from zero to 9 pounds, a second switch may produce current levels which are indicative of load cell readings between 10 and 90 pounds at 10-pound steps, a third contact may produce readings between 1,000 and 9,000 pounds in 1,000-pound steps and so forth. In this way, the digital potentiometer acts as digital current sources with the current levels being equated to scale weight in pounds and calibrated to properly subtract from the load cell output.

The same oscillator which supplies the load cell, also couples power of one of the phases to the digital potentiometer. The phase selected for the digital potentiometer is approximately 180° out of phase with the output of the load cell so that the digital potentiometer current sources effectively subtract from the load cell output signal to produce a null condition when the actual weight being sustained by the load cell equals the preset current analog output from the digital potentiometer.

The combined load cell and digital switch signals are algebraically added at a current summation point, and the difference is coupled to a phase detector and to a null indicator. The phase detector is also supplied by the oscillator to reject spurious signals, and the null indicator produces a proper indication when a balance is achieved between the output of the load cell and the output of the digital potentiometer.

The present invention also provides a differential amplifier at the output of the phase detector, and a relay is supplied by the differential amplifier. Through the use of this circuit, the digital potentiometer may be preset to a desired loading, and as load is gradually increased on the load cell, the output signal from the load cell will gradually increase until it equals the output of the digital potentiometer. At this point the load on the cell is equal to the selected loading of the digital potentiometer, and the differential amplifier will sense a null condition to trigger the relay and notify the user that the proper weight has been reached.

Referring to the drawings in greater detail, a conventional load cell 10 is supplied by an oscillator 11 at a pair of leads 12 and 13. Lead 12 is supplied with a signal of a first phase and lead 13 is supplied with a signal of a second phase. The oscillator output may be in the order of 2,500 Hz.

The load cell 10 produces an output at 14 which is of the same frequency as the oscillator 11 and which is of a phase similar to the phase appearing at the line 13 of the oscillator.

The load cell output signal at 14 is coupled to a current summation point 15. A balance potentiometer which includes a scaling resistor 16 is coupled from the current summation point 15. The scaling resistor 16 is connected to a movable contact or wiper 17 which cooperates with a resistor 18. The resistor 18 is coupled across the circuit lines 12 and 13 which provide the output of the oscillator and the input to the load cell. The resistor 18 is coupled to the lines 12 and 13 at circuit junction points 19 and 20. The purpose of the resistors 16 and 18 is to null out any dead weight loading.

The output from the current summation point 15 is coupled directly to an operational amplifier 21 and from the amplifier 21 to a phase detector 22. A feedback resistor 23 is coupled across the operational amplifier in a well understood manner.

The output from the oscillator 11 is coupled from circuit junction points 20 and 24 associated with the circuit lines 12 and 13 to the phase detector 22. In this way, the phase detector is used to reject spurious signals which may otherwise give a false reading at the output of the system.

The output of the phase detector 22 is coupled to a null indicator 25. The null indicator may be any form of meter or the like which is used to indicate a zero output signal.

In addition, the output of the phase detector may be coupled to a differential amplifier 26 as shown by the dotted line 27. In this case, the output of the differential amplifier is coupled directly to a relay 28 which in turn operates a relay switch 29 between a pair of contacts 30 and 31.

The digital potentiometer is indicated generally by the reference numeral 32 and is powered from the oscillator 11. In particular, the circuit line 33 is coupled from the circuit junction point 24 at the oscillator output 12, and the digital potentiometer is coupled to the circuit line 33 by a connection 34. In this way, the digital potentiometer is powered from a source of oscillations which is opposite in phase to the phase developed at the output 14 of the load cell. In this regard, it should be recalled that the output of the load cell at 14 is similar in phase to the output of the oscillator at the circuit line 13.

The digital potentiometer has an output at 35 which is coupled through a line 36 directly to the current summation point 15. Since the output of the digital potentiometer is opposite in phase from the output of the load cell, the two signals will subtract at the current summation point 15 and provide a null indication when the weight on the load cell equals the preset weight of the digital potentiometer.

Figure 2:
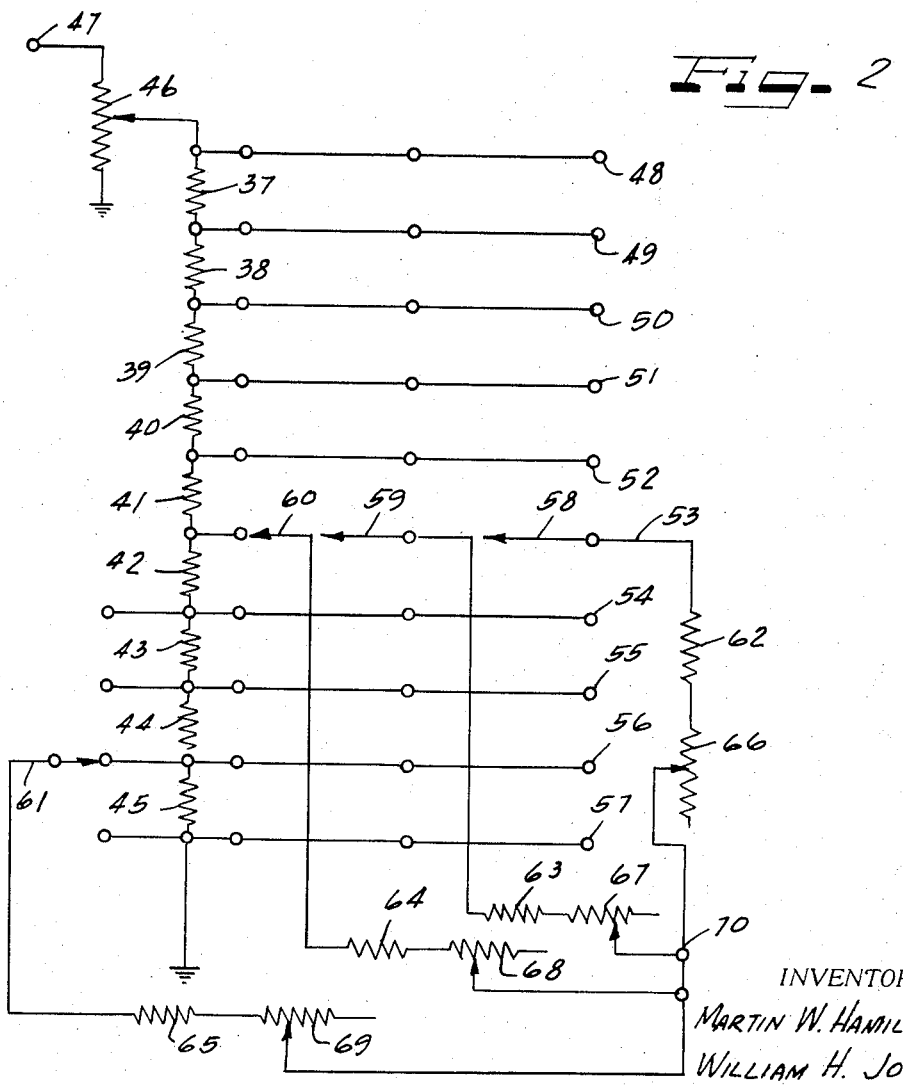
FIG. 2 is a schematic diagram illustrating the circuit features of the digital switch which is employed in conjunction with the load cell output of FIG. 1 to produce a null condition when a preset weight signal is balanced by the actual weight on the load cell.

The digital potentiometer is illustrated in FIG. 2 as comprising a plurality of series connected resistors 37 through 45. The resistor 37 is connected to an adjustment resistor 46 which is supplied at a terminal 47 from the oscillator circuit line 33. Each of the resistors 37 through 45 has a series of contacts 48 through 57 which correspond to the nine through zero positions.

In this case, four movable contacts 58 through 61 are provided. Each of these contacts has a fixed resistor, namely resistors 62 through 65 and a movable resistor or scaling resistor, namely resistors 66 through 69. All of these contacts are connected in parallel to a common output at circuit point 70.

The resistance in series with the contact 58 is ten times the resistance in series with the contact 59. The resistance in series with the contact 59 is likewise ten times the resistance in series with the contact 60 and so forth. In this way, the current associated with movement of the contact 58 between any two of the contact points 48 through 57 may be associated with 1-pound steps, the contact 59 with 10-pound steps, the contact 60 with 100-pound steps, and the contact 61 with 1,000-pound steps. In this way, digital current levels are established at the point 70 which is coupled to the current summation point 15 as described.

We claim as our invention:

1. A manual digital scale system comprising a load cell, a digital potentiometer, an oscillator for developing a relatively high frequency signal, means coupling the oscillator to the load cell to produce an output signal therefrom of a first phase, means coupling the oscillator across the digital potentiometer to produce an output therefrom of a second phase 180° displaced from the first phase, combining circuit means including a circuit summing point for combining the output of the digital potentiometer with the output of the load cell, phase detector means for comparing the phase of the signal derived from the circuit summing point with an output of the oscillator and for developing an output signal, means responsive to the output signal for indicating when the setting on the digital potentiometer has a predetermined relation to the output of the load cell.

2. A manual digital scale in accordance with claim 1 wherein said digital potentiometer comprises a plurality of series connected resistors having contact points therebetween and a plurality of movable contacts cooperable with each of said contact points to provide a plurality of current sources to the output thereof.

3. A manual digital scale in accordance with claim 2 wherein each of said movable contacts has a scaling resistor coupled in series therewith to provide different level current sources.

4. A manual digital scale in accordance with claim 3 wherein each of said scaling resistors are substantially one-tenth the magnitude of a preceding one of said scaling resistors.

5. A manual digital scale in accordance with claim 4 wherein said series connected resistors are of substantial equal magnitude.

* * * * *